United States Patent
Ekanayake et al.

(10) Patent No.: US 10,344,677 B2
(45) Date of Patent: Jul. 9, 2019

(54) SYSTEMS AND METHODS FOR PREHEATING FUEL FOR GAS TURBINE ENGINES

(71) Applicant: General Electric Company, Schenectady, NY (US)

(72) Inventors: Sanji Ekanayake, Atlanta, GA (US); Alston Ilford Scipio, Atlanta, GA (US); Joseph Klosinski, Atlanta, GA (US); William Theadore Fisher, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 621 days.

(21) Appl. No.: 14/290,608

(22) Filed: May 29, 2014

(65) Prior Publication Data

US 2015/0345401 A1 Dec. 3, 2015

(51) Int. Cl.
| | |
|---|---|
| *F02C 7/224* | (2006.01) |
| *F02C 7/22* | (2006.01) |
| *F02C 7/10* | (2006.01) |
| *F02C 7/08* | (2006.01) |

(52) U.S. Cl.
CPC ............ *F02C 7/224* (2013.01); *F02C 7/08* (2013.01); *F02C 7/10* (2013.01); *F02C 7/22* (2013.01); *F05B 2270/105* (2013.01); *F23K 2301/204* (2013.01)

(58) Field of Classification Search
CPC ...... F23K 2301/204; F02C 7/224; F02C 7/22; F02C 7/08; F02C 7/10; F02C 7/143; F02C 9/18; F02C 6/18; F02C 7/20; F02C 3/04; F05B 2270/105; Y02E 20/16

See application file for complete search history.

(56) References Cited

U.S. PATENT DOCUMENTS

| | | | |
|---|---|---|---|
| 4,561,245 A | 12/1985 | Ball et al. | |
| 4,773,212 A * | 9/1988 | Griffin | ............... F02C 7/224 60/226.1 |
| 5,095,693 A * | 3/1992 | Day | .................. F02C 3/30 60/39.59 |

(Continued)

OTHER PUBLICATIONS

Co-pending U.S. Appl. No. 14/060,829, filed Oct. 23, 2013, entitled: "Method and System for Improving the Efficiency of a Simple Cycle Gas Turbine System With a Closed Circuit Fuel Heating System".

*Primary Examiner* — Todd E Manahan
*Assistant Examiner* — Thuyhang N Nguyen
(74) *Attorney, Agent, or Firm* — Eversheds Sutherland (US) LLP

(57) ABSTRACT

Systems and methods for preheating fuel in a gas turbine engine are provided. In one embodiment, a system may include a gas turbine engine, a fuel line in fluid communication with the gas turbine engine, a gas turbine compartment disposed about the gas turbine engine, and a first conduit in fluid communication with the gas turbine compartment. The first conduit may include ventilation discharge air from the gas turbine compartment. The system also may include a first heat exchanger in communication with the fuel line and the first conduit. The first heat exchanger may be configured to exchange heat between the fuel and the ventilation discharge air from the gas turbine compartment.

20 Claims, 4 Drawing Sheets

(56) References Cited

U.S. PATENT DOCUMENTS

| | | | |
|---|---|---|---|
| 5,826,430 A * | 10/1998 | Little | F01K 23/10 60/736 |
| 6,253,554 B1 * | 7/2001 | Kobayashi | F02C 7/12 60/736 |
| 6,415,595 B1 * | 7/2002 | Wilmot, Jr. | B64D 13/006 60/266 |
| 7,716,930 B2 | 5/2010 | Chillar et al. | |
| 8,261,528 B2 | 9/2012 | Chillar et al. | |
| 8,534,073 B2 * | 9/2013 | Garcia-Crespo | F02C 3/34 60/39.52 |
| 2009/0260342 A1 * | 10/2009 | Ishiguro | F02C 1/04 60/39.511 |
| 2009/0301078 A1 | 12/2009 | Chillar et al. | |
| 2013/0125557 A1 | 5/2013 | Scipio et al. | |
| 2013/0193127 A1 | 8/2013 | Scipio et al. | |
| 2013/0340439 A1 | 12/2013 | Ekanayake et al. | |

* cited by examiner

SYSTEMS AND METHODS FOR PREHEATING FUEL FOR GAS TURBINE ENGINES

FIELD OF THE DISCLOSURE

The disclosure relates generally to gas turbine engines and more particularly relates to systems and methods for preheating fuel for gas turbine engines.

BACKGROUND

Typical combined cycle systems utilize gas turbines to generate power. The exhaust gases generated by the gas turbines may be directed to a heat recovery steam generator to produce steam that can be used to generate more power. Fuel heating in combined cycle systems is typically performed to increase the thermal efficiency. In some instances, steam from the heat recovery steam generator may be used to heat the fuel. This approach limits the power output of the combined cycle system because the steam is being used to heat the fuel and not being used to generate power. Accordingly, systems and methods to reduce the amount of steam diverted from the heat recover steam generator to heat the fuel are desired.

SUMMARY

Some or all of the above needs and/or problems may be addressed by certain embodiments of the disclosure. The disclosure provides systems and methods for preheating fuel in a gas turbine engine. In one embodiment, a system may include a gas turbine engine, a fuel line in fluid communication with the gas turbine engine, a gas turbine compartment disposed about the gas turbine engine, and a first conduit in fluid communication with the gas turbine compartment. The first conduit may include ventilation discharge air from the gas turbine compartment. The system also may include a first heat exchanger in communication with the fuel line and the first conduit. The first heat exchanger may be configured to exchange heat between the fuel and the ventilation discharge air from the gas turbine compartment.

In another embodiment, the disclosure provides a system for preheating fuel in a gas turbine engine. The system may include a gas turbine engine, a fuel line in fluid communication with the gas turbine engine, a gas turbine compartment disposed about the gas turbine engine, and a first conduit in fluid communication with the gas turbine compartment. The first conduit may include ventilation discharge air from the gas turbine compartment. The system also may include a heat exchanger system in communication with the fuel line and the first conduit. The heat exchanger system may be configured to exchange heat between the fuel and the ventilation discharge air from the gas turbine compartment.

In yet another embodiment, the disclosure provides a method for preheating fuel in a gas turbine engine. The method may include positioning a first heat exchanger about a fuel line, supplying ventilation discharge air from a gas turbine compartment to the first heat exchanger, and exchanging heat between the fuel and the ventilation discharge air from the gas turbine compartment at the first heat exchanger.

These and other embodiments, aspects, and features of the disclosure will become apparent to those skilled in the art from the following detailed description, the accompanying drawings, and the appended claims.

BRIEF DESCRIPTION OF THE DRAWINGS

Reference will now be made to the accompanying drawings, which are not necessarily drawn to scale.

DETAILED DESCRIPTION

Figure 1:
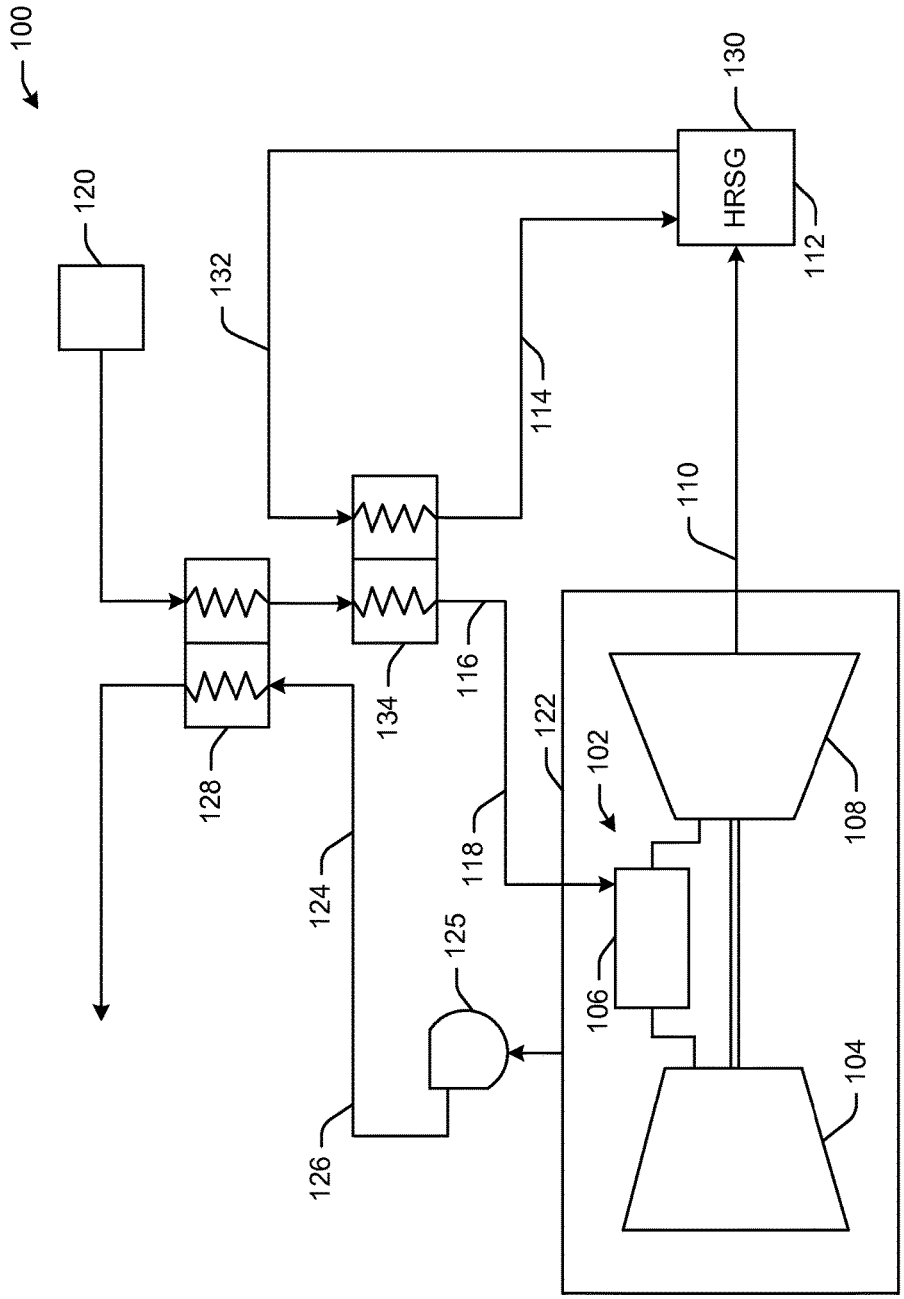
FIG. 1 is a schematic view of a system according to one or more embodiments.
Figure 2:
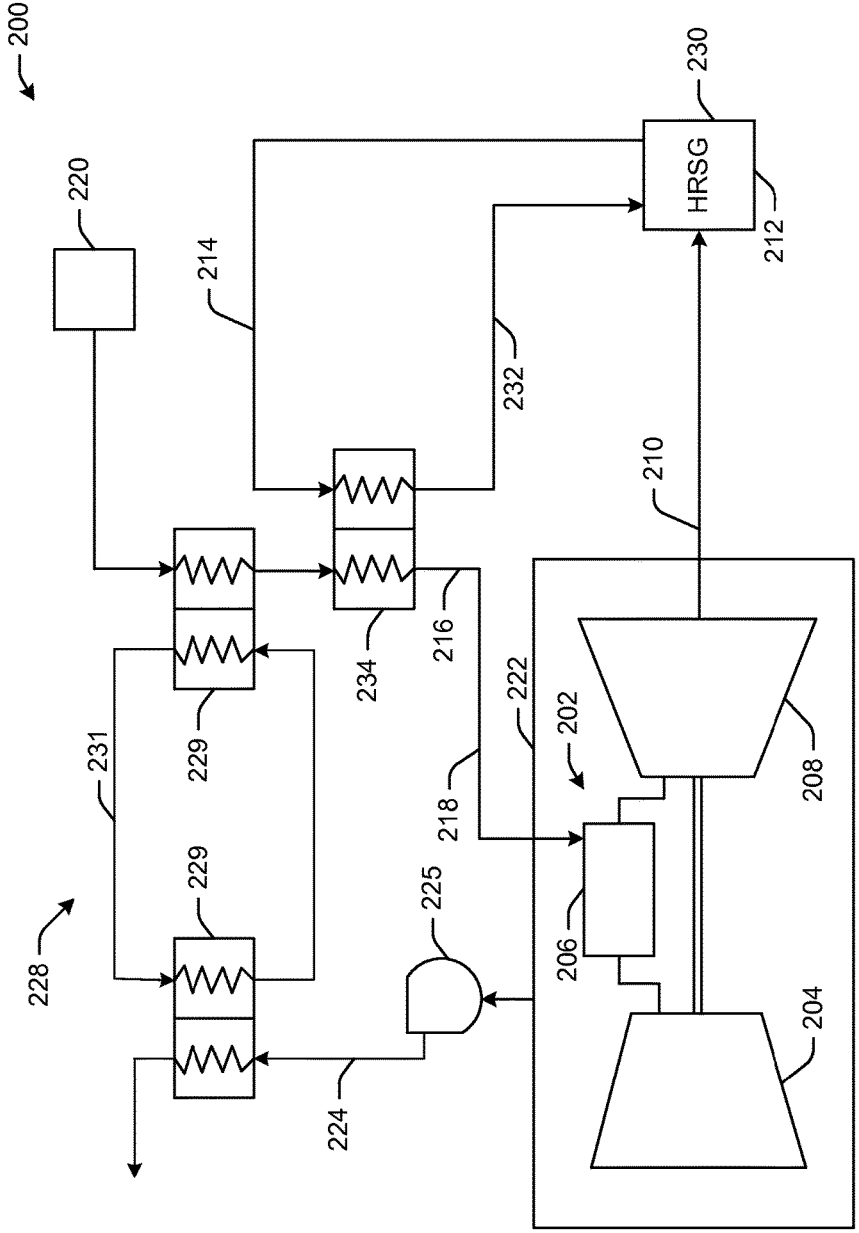
FIG. 2 is a schematic view of a system according to one or more embodiments.
Figure 3:
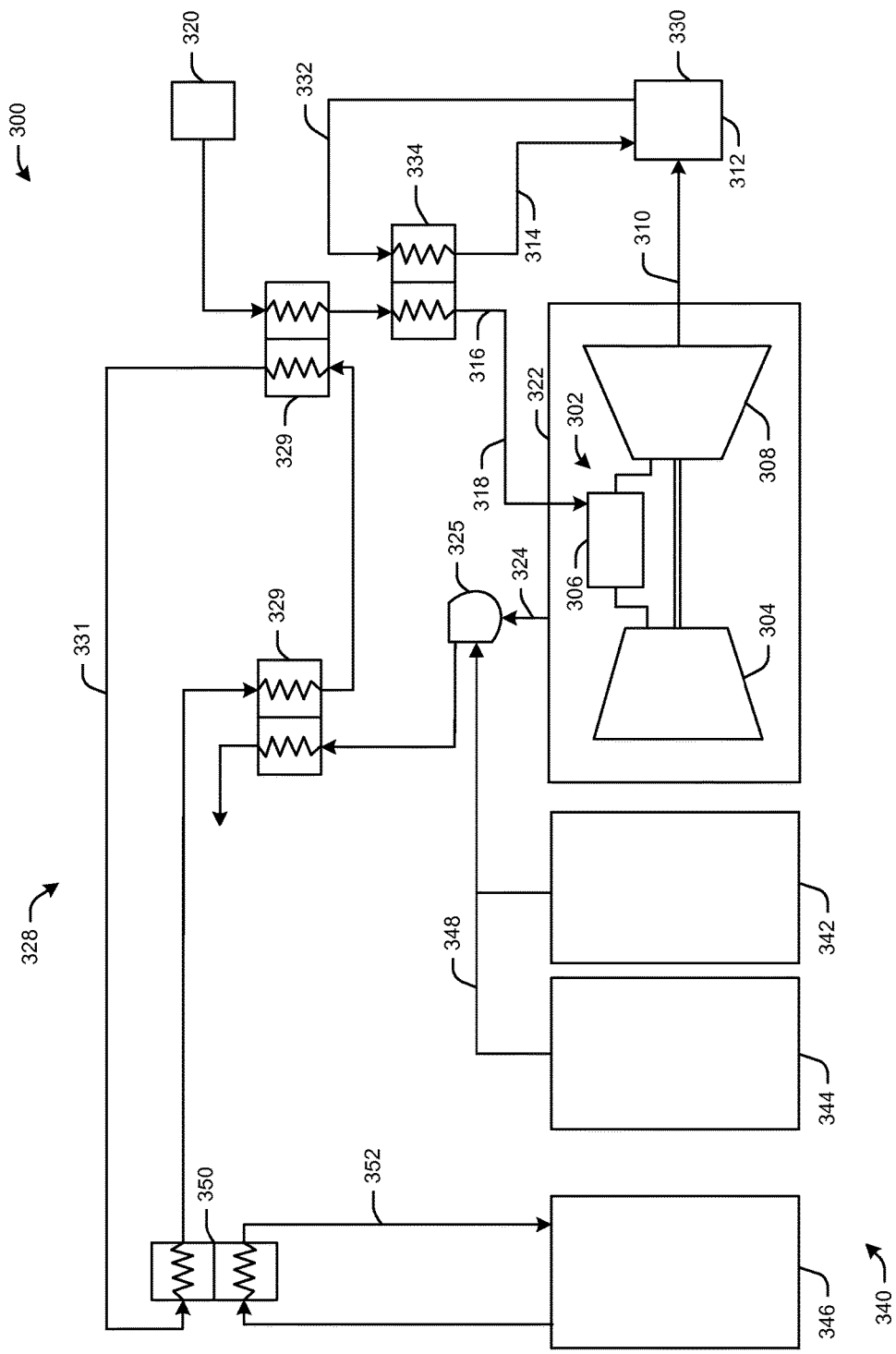
FIG. 3 is a schematic view of a system according to one or more embodiments.

Referring now to the drawings, in which like numerals refer to like elements throughout the several views, FIGS. 1-3 are example embodiments of systems for preheating fuel in gas turbine engines. The various systems (or combinations thereof) may provide the technical effect and/or solution of reducing steam load demand. In addition, the various systems (or combinations thereof) may improve combined cycle heat rate and output. Other advantages may become apparent throughout the disclosure.

FIG. 1 is an example embodiment of a system 100 for preheating fuel in a gas turbine engine 102. The gas turbine engine 102 may include a compressor 104, a combustor 106, and a turbine 108. The compressor 104 may compress an incoming flow of air. The compressor 104 may deliver the compressed flow of air to the combustor 106, where the compressed flow of air mixes with a compressed flow of fuel. The air/fuel mixture may be ignited to create a flow of combustion gases. The flow of combustion gases may be delivered to the turbine 108. The flow of combustion gases may drive the turbine 108 to produce mechanical work. The mechanical work produced in the turbine 108 may drive the compressor 104 and an external load, such as an electrical generator or the like. The flow of combustion gases may be exhausted via an exhaust subsystem 110 or the like to a stack or otherwise disposed. In some instances, the flow of combustion gases may be exhausted to a heat recovery steam generator 112, which may convert the flow of combustion gases to a flow of steam 114.

The gas turbine engine 102 may use natural gas, various types of syngas, and/or other types of fuels. The gas turbine engine 102 may be anyone of a number of different gas turbine engines such as those offered by General Electric Company of Schenectady, N.Y. and the like. The gas turbine engine 102 may have different configurations and may use other types of components. Other types of gas turbine engines also may be used herein. Multiple gas turbine engines, other types of turbines, and other types of power generation equipment also may be used herein together.

In certain embodiments, a fuel line 116 may be in fluid communication with the combustor 106. The fuel line 116 may be configured to supply a fuel 118 (gas or liquid) to the combustor 106 from a fuel source 120. Any number of fuel lines and/or fuel sources may be used.

The gas turbine engine 102 may be wholly or partially enclosed by a gas turbine compartment 122. During operation of the gas turbine engine 102, waste heat may be released into the gas turbine compartment 122, which in turn may heat the air within the gas turbine compartment 122. The system 100 may utilize the waste heat from the gas turbine compartment 122 to preheat the fuel 118. For example, a first conduit 124 may be in fluid communication with the gas turbine compartment 122. The first conduit 124 may include ventilation discharge air 126 from the gas turbine compartment 122. A first heat exchanger 128 (e.g., a fuel preheater) may be in communication with the fuel line 118 and the first conduit 124. The first heat exchanger 128 may be configured to exchange heat between the fuel 118 and the ventilation discharge air 126 from the gas turbine compartment 122. That is, the first heat exchanger 128 may preheat the fuel 118 using waste heat from the ventilation discharge air 126 of the gas turbine compartment 122 in whole or in part. Other types of heat exchangers devices may be used.

The ventilation discharge air 126 may be extracted from the gas turbine compartment 122 by at least one extraction blower 125 (or exhaust fan) disposed about the first conduit 124. That is, the extraction blower 125 may draw the heated air out of the gas turbine compartment 122. In some instances, the ventilation discharge air 126 from the gas turbine compartment 120 may be used to preheat the fuel 118 in whole or in part. After preheating the fuel 118, the ventilation discharge air 126 from the gas turbine compartment 122 may be discharged to the atmosphere or directed elsewhere for other uses. Other types of extraction devices may be used.

The system 100 also may include a steam source 130 configured to generate steam 114. In some instances, the steam source 130 may be the heat recovery steam generator 112. Any steam source may be used, including external steam sources. A second conduit 132 may be in fluid communication with the steam source 130. In addition, a second heat exchanger 134 (e.g., a primary fuel heater) may be in communication with the fuel line 116 and the second conduit 132. The second heat exchanger 134 may be configured to exchange heat between the fuel 118 and the steam 114 from the steam source 130 in whole or in part. Other types of heat exchanger devices may be used.

In some instances, the second heat exchanger 134 may be disposed about the fuel line 116 downstream of the first heat exchanger 128. In this manner, the fuel 118 may be preheated by the first heat exchanger 128 using ventilation discharge air 126 (i.e., waste heat) from the gas turbine compartment 122. Preheating the fuel 118 with the first heat exchanger 128 may reduce the amount of steam 114 necessary to heat the fuel 118 with the second heat exchanger 134.

FIG. 2 is an example embodiment of a system 200 for preheating fuel in a gas turbine engine 202. The gas turbine engine 202 may include a compressor 204, a combustor 206, and a turbine 208. In some instances, an exhaust subsystem 210 of the gas turbine engine 202 may be in communication with a heat recovery steam generator 212 for generating steam 214. In certain embodiments, a fuel line 216 may be in fluid communication with the combustor 206. The fuel line 216 may be configured to supply a fuel 218 (gas or liquid) to the combustor 206 from a fuel source 220. Any number of fuel lines and/or fuel sources may be used.

The gas turbine engine 202 may be wholly or partially enclosed by a gas turbine compartment 222. During operation of the gas turbine engine 202, waste heat may be released into the gas turbine compartment 222, which in turn may heat the air within the gas turbine compartment 222. The system 200 may utilize the waste heat from the gas turbine compartment 222 to preheat the fuel 218. For example, a first conduit 224 may be in fluid communication with the gas turbine compartment 222. The first conduit 224 may include ventilation discharge air 226 from the gas turbine compartment 222. A heat exchanger system 228 may be in communication with the fuel line 216 and the first conduit 224. The heat exchanger system 228 may be configured to exchange heat between the fuel 218 and the ventilation discharge air 226 from the gas turbine compartment 222. That is, the heat exchanger system 228 may preheat the fuel 218 using waste heat from the ventilation discharge air 226 of the gas turbine compartment 222.

In some instances, the heat exchanger system 228 may include two fuel preheater heat exchangers 229. The fuel preheater heat exchangers 229 may be in communication with each other by way of one or more fuel preheater conduits 231. The fuel preheater conduit 231 may include a heat transfer fluid therein for transferring heat between the fuel preheater heat exchangers 229. The fuel preheater heat exchangers 229 may exchange heat between the fuel 218 and the ventilation discharge air 226 from the gas turbine compartment 222.

The ventilation discharge air 226 may be extracted from the gas turbine compartment 222 by at least one extraction blower 225 (or exhaust fan) disposed about the first conduit 224. That is, the extraction blower 225 may draw the heated air out of the gas turbine compartment 222. In some instances, the ventilation discharge air 226 from the gas turbine compartment 220 may be used to preheat the fuel 218. After preheating the fuel 218, the ventilation discharge air 226 from the gas turbine compartment 222 may be discharged to the atmosphere or other uses.

The system 200 also may include a steam source 230 configured to generate steam 214. In some instances, the steam source 230 may be the heat recovery steam generator 212. Any steam source may be used, including external steam sources. A second conduit 232 may be in fluid communication with the steam source 230. In addition, a second heat exchanger 234 (e.g., a primary fuel heater) may be in communication with the fuel line 216 and the second conduit 232. The second heat exchanger 234 may be configured to exchange heat between the fuel 218 and the steam 214 from the steam source 230.

In some instances, the second heat exchanger 234 may be disposed about the fuel line 216 downstream of the heat exchanger system 228. In this manner, the fuel 218 may be preheated by the heat exchanger system 228 using ventilation discharge air 226 (i.e., waste heat) from the gas turbine compartment 222. Preheating the fuel 218 may reduce the amount of steam 214 necessary to heat the fuel 218 by the second heat exchanger 234.

FIG. 3 is an example embodiment of a system 300 for preheating fuel in a gas turbine engine 302. The gas turbine engine 302 may include a compressor 304, a combustor 306, and a turbine 308. In some instances, an exhaust subsystem 310 of the gas turbine engine 302 may be in communication with a heat recovery steam generator 312 for generating steam 314. In certain embodiments, a fuel line 316 may be in fluid communication with the combustor 306. The fuel line 316 may be configured to supply a fuel 318 (gas or liquid) to the combustor 306 from a fuel source 320. Any number of fuel lines and fuel sources may be used.

The gas turbine engine 302 may be wholly or partially enclosed by a gas turbine compartment 322. During operation of the gas turbine engine 302, waste heat may be released into the gas turbine compartment 322, which in turn may heat the air within the gas turbine compartment 322. The system 300 may utilize the waste heat from the gas turbine compartment 322 to preheat the fuel 318. For example, a first conduit 324 may be in fluid communication with the gas turbine compartment 322. The first conduit 324 may include ventilation discharge air 326 from the gas turbine compartment 322. A heat exchanger system 328 may be in communication with the fuel line 316 and the first conduit 324. The heat exchanger system 328 may be configured to exchange heat between the fuel 318 and the ventilation discharge air 326 from the gas turbine compartment 322. That is, the heat exchanger system 328 may preheat the fuel 318 using waste heat from the ventilation discharge air 326 of the gas turbine compartment 322.

In some instances, the heat exchanger system 328 may include two fuel preheater heat exchangers 329. The fuel preheater heat exchangers 329 may be in communication with each other by way of one or more fuel preheater conduits 331. The fuel preheater conduit 331 may include a heat transfer fluid therein for transferring heat between the fuel preheater heat exchangers 329. The fuel preheater heat exchangers 329 may exchange heat between the fuel 318 and the ventilation discharge air 326 from the gas turbine compartment 322.

The ventilation discharge air 326 may be extracted from the gas turbine compartment 322 by at least one extraction blower 325 (or exhaust fan) disposed about the first conduit 324. That is, the extraction blower 325 may draw the heated air out of the gas turbine compartment 322. In some instances, the ventilation discharge air 326 from the gas turbine compartment 320 may be used to preheat the fuel 318. After preheating the fuel 318, the ventilation discharge air 326 from the gas turbine compartment 322 may be discharged to the atmosphere or other uses.

In some instances, additional sources 340 of waste heat may be used in conjunction with (or alternative to) the waste heat from the gas turbine compartment 322 to preheat the fuel 318. For example, waste heat (such as heated air) from an air cooled generator 342 and/or switchgear compartments 344 may be used. In some instances, one or more conduits 348 may fluidly couple the heat exchanger system 328 with the gas turbine compartment 322, the air cooled generator 342, and/or switchgear compartments 344. In addition, the extraction blower 325 may draw the heated air out of the gas turbine compartment 120, the air cooled generator 132, and/or switchgear compartments 134.

In certain embodiments, the additional sources 340 of waste heat may include a liquid cooled main drive box 346. The liquid cooled main drive box 346 may be in communication with the heat exchanger system 328 by way of one or more conduits 352 and/or one or more heat exchangers 350. In this manner, waste heat (such as heated liquid) from the liquid cooled main drive box 346 may be used.

The system 300 also may include a steam source 330 configured to generate steam 314. In some instances, the steam source 330 may be the heat recovery steam generator 312. Any steam source may be used, including external steam sources. A second conduit 332 may be in fluid communication with the steam source 330. In addition, a second heat exchanger 334 (e.g., a primary fuel heater) may be in communication with the fuel line 316 and the second conduit 332. The second heat exchanger 334 may be configured to exchange heat between the fuel 318 and the steam 314 from the steam source 330.

In some instances, the second heat exchanger 334 may be disposed about the fuel line 316 downstream of the heat exchanger system 328. In this manner, the fuel 318 may be preheated by the heat exchanger system 328 using ventilation discharge air 326 (i.e., waste heat) from the gas turbine compartment 222 and/or waste heat from the additional sources 340. Preheating the fuel 318 may reduce the amount of steam 314 necessary to heat the fuel 318 by the second heat exchanger 334.

Figure 4:
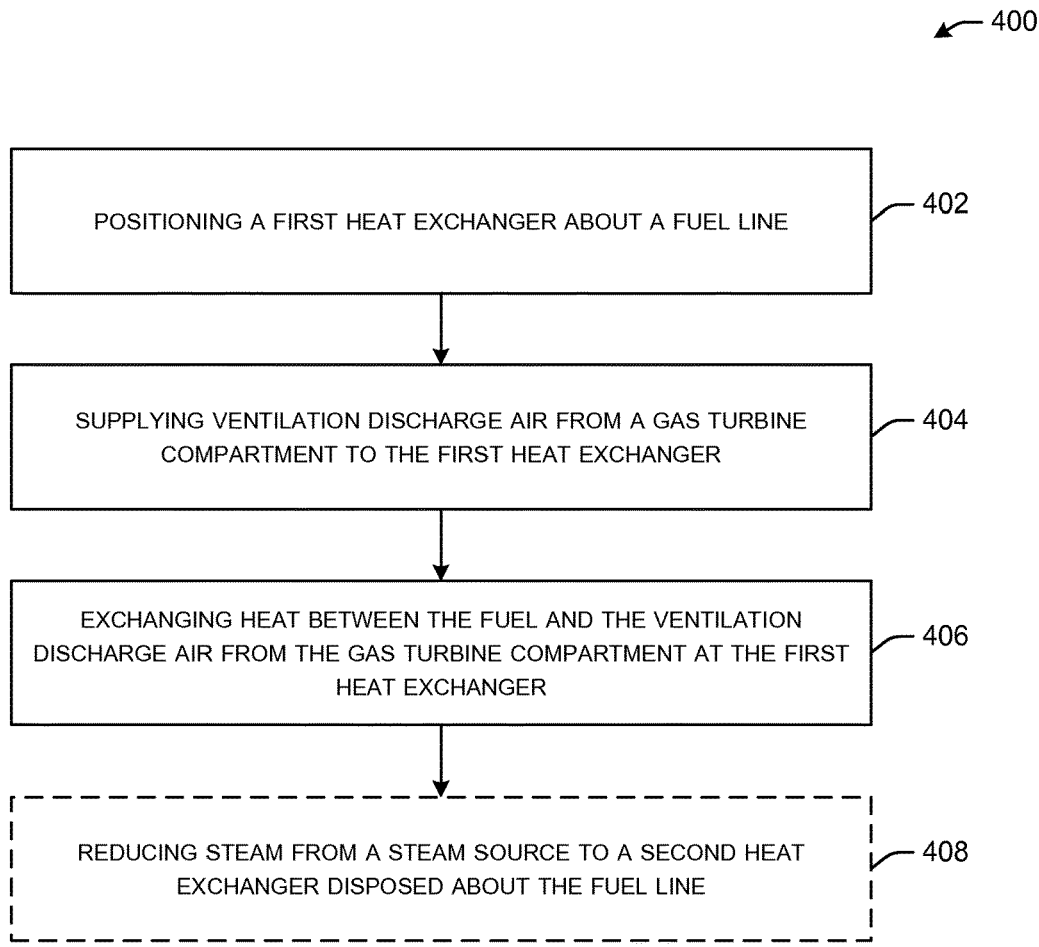
FIG. 4 is a flow chart illustrating a method according to one or more embodiments.

FIG. 4 is a flow chart illustrating a method 400 for preheating fuel in a gas turbine engine. At block 402 of the method 400, a first heat exchanger may be positioned about a fuel line. The first heat exchanger may be a fuel preheater. At block 404 of the method 400, ventilation discharge air from a gas turbine compartment maybe supplied to the first heat exchanger. Next, at block 406 of the method 400, heat may be exchanged between the fuel and the ventilation discharge air from the gas turbine compartment at the first heat exchanger. In some instances, at block 408 of the method 400, steam from a steam source may be reduced to a second heat exchanger disposed about the fuel line downstream of the first heat exchanger.

In certain embodiments, the systems and methods described herein may be implemented by one or more controllers in communication with the various components of the systems. The controller may receive inputs from one or more sensors disposed about the various components of the systems. The controller may be configured to activate one or more actuators, including valves, pumps, etc. The controller may be an independent controller or integrated with a gas turbine control system. The controller may include at least a memory and one or more processing units (or processor(s)). The processor(s) may be implemented as appropriate in hardware, software, firmware, or combinations thereof. Software or firmware implementations of the processor(s) may include computer-executable or machine-executable instructions written in any suitable programming language to perform the various functions described herein. Moreover, the processor may be associated with a network, a server, a computer, or a mobile device.

It should be apparent that the foregoing relates only to certain embodiments of the present application and that numerous changes and modifications may be made herein by one of ordinary skill in the art without departing from the general spirit and scope of the disclosure as defined by the following claims and the equivalents thereof.

That which is claimed is:

1. A system for preheating a fuel in a gas turbine engine, the system comprising:
   a fuel line in fluid communication with the gas turbine engine wherein the gas turbine engine is enclosed by an outer casing;
   a gas turbine engine compartment disposed about the gas turbine engine so as to wholly enclose the outer casing of the gas turbine engine, wherein waste heat from the gas turbine engine heats air located within the gas turbine engine compartment and outward of the outer casing, to produce a ventilation discharge air;
   a first conduit in fluid communication with the gas turbine engine compartment, wherein the first conduit supplies the ventilation discharge air from the gas turbine engine compartment; and
   a first heat exchanger in communication with the fuel line and the first conduit, wherein the first heat exchanger is configured to exchange heat between the fuel and the ventilation discharge air from the gas turbine engine compartment.

2. The system of claim 1, further comprising:
   a steam source configured to generate steam;
   a second conduit in fluid communication with the steam source; and
   a second heat exchanger in communication with the fuel line and the second conduit, wherein the second heat exchanger is configured to exchange heat between the fuel and steam from the steam source.

3. The system of claim 2, wherein the steam source comprises a heat recovery steam generator.

4. The system of claim 2, wherein the second heat exchanger is disposed about the fuel line downstream of the first heat exchanger.

5. The system of claim 1, wherein the first conduit vents to an atmosphere.

6. The system of claim 1, further comprising at least one extraction blower disposed about the first conduit.

7. The system of claim 1, wherein the gas turbine engine comprises:
a compressor;
a combustor in communication with the compressor; and
a turbine in communication with the combustor.

8. The system of claim 1, further comprising additional waste heat sources in communication with the first heat exchanger.

9. A method for preheating fuel in a gas turbine engine, the method comprising:
positioning a first heat exchanger about a fuel line wherein the fuel line in fluid communication with the gas turbine engine wherein the gas turbine engine is enclosed by an outer casing;
supplying ventilation discharge air from a gas turbine compartment to the first heat exchanger wherein the gas turbine engine compartment is disposed about the gas turbine engine so as to wholly enclose the outer casing of the gas turbine engine, wherein waste heat from the gas turbine engine heats air located within the gas turbine engine compartment and outward of the outer casing, to produce the ventilation discharge air; and
exchanging heat between the fuel and the ventilation discharge air from the gas turbine compartment at the first heat exchanger.

10. The method of claim 9, further comprising reducing steam from a steam source to a second heat exchanger disposed about the fuel line.

11. The method of claim 9, further comprising supplying additional waste heat from additional waste heat sources to the first heat exchanger.

12. A system for preheating a fuel in a gas turbine engine, the system comprising:
a fuel line in fluid communication with the gas turbine engine wherein the gas turbine engine enclosed by an outer casing;
a gas turbine engine compartment disposed about the gas turbine engine so as to wholly enclose the outer casing of the gas turbine engine, wherein waste heat from the gas turbine engine heats air located within the gas turbine engine compartment and outward of the outer casing, to produce a ventilation discharge air;
a first conduit in fluid communication with the gas turbine engine compartment, wherein the first conduit supplies the ventilation discharge air from the gas turbine engine compartment;
a heat exchanger system in communication with the fuel line and the first conduit, wherein the heat exchanger system is configured to exchange heat between the fuel and the ventilation discharge air from the gas turbine engine compartment.

13. The system of claim 12, wherein the heat exchanger system comprise at least two preheater heat exchangers in communication with each other by way of one or more preheater conduits.

14. The system of claim 12, further comprising:
a steam source configured to generate steam;
a second conduit in fluid communication with the steam source; and
a second heat exchanger in communication with the fuel line and the second conduit, wherein the second heat exchanger is configured to exchange heat between the fuel and steam from the steam source.

15. The system of claim 14, wherein the steam source comprises a heat recovery steam generator.

16. The system of claim 14, wherein the second heat exchanger is disposed about the fuel line downstream of the heat exchanger system.

17. The system of claim 12, wherein the first conduit vents to an atmosphere.

18. The system of claim 12, further comprising at least one extraction blower disposed about the first conduit.

19. The system of claim 12, wherein the gas turbine engine comprises:
a compressor;
a combustor in communication with the compressor; and
a turbine in communication with the combustor.

20. The system of claim 12, further comprising additional waste heat sources in communication with the heat exchanger system.

* * * * *